US010810542B2

(12) United States Patent
Rajkhowa et al.

(10) Patent No.: US 10,810,542 B2
(45) Date of Patent: Oct. 20, 2020

(54) SYSTEMS AND METHODS FOR FULFILMENT DESIGN AND OPTIMIZATION

(71) Applicant: Walmart Apollo, LLC, Bentonville, AR (US)

(72) Inventors: Pratosh Deepak Rajkhowa, Whitefield (IN); Ameya Ajay Shendre, Marathalli (IN)

(73) Assignee: Walmart Apollo, LLC, Bentonville, AK (US)

( * ) Notice: Subject to any disclaimer, the term of this patent is extended or adjusted under 35 U.S.C. 154(b) by 170 days.

(21) Appl. No.: 15/977,777

(22) Filed: May 11, 2018

(65) Prior Publication Data
US 2018/0330316 A1 Nov. 15, 2018

(30) Foreign Application Priority Data

May 11, 2017 (IN) .............................. 201711016552

(51) Int. Cl.
*G06Q 10/08* (2012.01)
*G06Q 10/06* (2012.01)
*G06Q 10/04* (2012.01)

(52) U.S. Cl.
CPC ......... *G06Q 10/087* (2013.01); *G06Q 10/047* (2013.01); *G06Q 10/06316* (2013.01)

(58) Field of Classification Search
CPC ........... G06Q 10/087; G06Q 10/06316; G06Q 10/047
See application file for complete search history.

(56) References Cited

U.S. PATENT DOCUMENTS

| 6,246,998 | B1 | 6/2001 | Matsumori |
| 7,147,154 | B2 | 12/2006 | Myers et al. |
| 7,295,990 | B1 * | 11/2007 | Braumoeller ........ G06Q 10/063 705/7.31 |

(Continued)

FOREIGN PATENT DOCUMENTS

| CN | 101778045 A | 7/2010 |
| CN | 101964799 A | 2/2011 |

(Continued)

OTHER PUBLICATIONS

J. P. Gagliardi, J. Renaud and A. Ruiz, "A Simulation Model to Improve Warehouse Operations," 2007 Winter Simulation Conference, Washington, DC, 2007, pp. 2012-2018, doi: 10.1109/WSC.2007.4419831. (Year: 2007).*

(Continued)

*Primary Examiner* — Ashford S Hayles
(74) *Attorney, Agent, or Firm* — McCarter & English, LLP

(57) ABSTRACT

A system for fulfillment & optimization. The system includes an optimization engine that executes scenario simulations, wherein the scenario simulations generate pick information. The optimization engine selects a best scenario from at least two scenarios based on the scenario information. In response to the selection of the best scenario, the optimization engine configures a computing system to execute a zoning policy, a routing policy, and a base algorithm policy associated with the best scenario. The computing system executes the zoning policy, the routing policy, and the base algorithm policy to fulfill orders.

16 Claims, 11 Drawing Sheets

(56) References Cited

U.S. PATENT DOCUMENTS

| | | | |
|---|---|---|---|
| 7,747,543 B1* | 6/2010 | Braumoeller | G06Q 10/083 705/330 |
| 7,949,686 B2 | 5/2011 | Chang et al. | |
| 8,005,761 B1 | 8/2011 | Braumoeller et al. | |
| 8,121,876 B1 | 2/2012 | Braumoeller et al. | |
| 8,201,737 B1 | 6/2012 | Palacios Durazo et al. | |
| 8,401,914 B1 | 3/2013 | Kim | |
| 8,428,988 B1 | 4/2013 | Braumoeller et al. | |
| 8,818,836 B1 | 8/2014 | Braumoeller et al. | |
| 9,147,208 B1 | 9/2015 | Argue et al. | |
| 9,466,045 B1* | 10/2016 | Kumar | G06Q 10/087 |
| 9,470,532 B2 | 10/2016 | Pellow et al. | |
| 9,626,709 B2 | 4/2017 | Koch et al. | |
| 10,127,514 B2 | 11/2018 | Napoli | |
| 2002/0174038 A1* | 11/2002 | Chien | G06Q 10/087 705/28 |
| 2002/0198756 A1 | 12/2002 | Ghaisas et al. | |
| 2003/0033177 A1 | 2/2003 | MacGonigle et al. | |
| 2003/0177072 A1 | 9/2003 | Bared | |
| 2004/0010437 A1 | 1/2004 | Kiran et al. | |
| 2004/0068443 A1 | 4/2004 | Hopson et al. | |
| 2004/0210621 A1* | 10/2004 | Antonellis | G06Q 10/087 709/200 |
| 2005/0278062 A1* | 12/2005 | Janert | G06Q 10/08 700/214 |
| 2007/0005377 A1* | 1/2007 | Cherry | G06Q 10/087 705/26.1 |
| 2007/0174144 A1 | 7/2007 | Borders et al. | |
| 2007/0244758 A1 | 10/2007 | Xie | |
| 2007/0250355 A1 | 10/2007 | Leet et al. | |
| 2009/0048878 A1 | 2/2009 | Metcalf | |
| 2009/0157472 A1 | 6/2009 | Burazin et al. | |
| 2009/0281921 A1 | 11/2009 | Foster et al. | |
| 2010/0010902 A1 | 1/2010 | Casey | |
| 2010/0287025 A1 | 11/2010 | Fletcher et al. | |
| 2012/0023034 A1 | 1/2012 | Lynch et al. | |
| 2012/0123674 A1 | 5/2012 | Perks et al. | |
| 2012/0150340 A1 | 6/2012 | Suess et al. | |
| 2012/0330458 A1 | 12/2012 | Weiss | |
| 2013/0030955 A1 | 1/2013 | David | |
| 2013/0035978 A1* | 2/2013 | Richardson | G06Q 30/0283 705/7.27 |
| 2013/0231990 A1 | 9/2013 | Munjal et al. | |
| 2013/0332273 A1 | 12/2013 | Gu et al. | |
| 2013/0346204 A1 | 12/2013 | Wissner-Gross et al. | |
| 2014/0003727 A1 | 1/2014 | Lortz et al. | |
| 2014/0040075 A1* | 2/2014 | Perry | G06Q 30/0635 705/26.81 |
| 2014/0046733 A1* | 2/2014 | Grichnik | G06Q 10/06375 705/7.37 |
| 2014/0095350 A1 | 4/2014 | Carr et al. | |
| 2014/0136255 A1* | 5/2014 | Grabovski | G06Q 10/063112 705/7.14 |
| 2014/0156553 A1 | 6/2014 | Leach et al. | |
| 2014/0207615 A1 | 7/2014 | Li et al. | |
| 2014/0266616 A1 | 9/2014 | Jones et al. | |
| 2014/0278627 A1 | 9/2014 | Grabovski et al. | |
| 2014/0279294 A1* | 9/2014 | Field-Darragh | H04B 5/0062 705/28 |
| 2014/0324491 A1 | 10/2014 | Banks et al. | |
| 2014/0336814 A1* | 11/2014 | Moore | G06Q 10/0875 700/216 |
| 2014/0351101 A1* | 11/2014 | Danelski | G06Q 30/06 705/28 |
| 2014/0379529 A1 | 12/2014 | Agasti et al. | |
| 2015/0051994 A1 | 2/2015 | Ward et al. | |
| 2015/0120514 A1* | 4/2015 | Deshpande | G06Q 30/0635 705/28 |
| 2015/0170256 A1 | 6/2015 | Pettyjohn | |
| 2015/0206093 A1 | 7/2015 | Trew et al. | |
| 2015/0242918 A1 | 8/2015 | McCarthy | |
| 2015/0278759 A1 | 10/2015 | Harris et al. | |
| 2015/0307278 A1* | 10/2015 | Wickham | G05B 15/02 700/216 |
| 2015/0310447 A1 | 10/2015 | Shaw | |
| 2016/0012391 A1 | 1/2016 | Burnett | |
| 2016/0055222 A1* | 2/2016 | Sarferaz | G06F 16/254 707/603 |
| 2016/0055452 A1 | 2/2016 | Qin | |
| 2016/0063604 A1 | 3/2016 | Shaffer et al. | |
| 2016/0071056 A1 | 3/2016 | Ellison et al. | |
| 2016/0092969 A1 | 3/2016 | Gopalsamy et al. | |
| 2016/0148300 A1 | 5/2016 | Carr et al. | |
| 2016/0171592 A1 | 6/2016 | Pugh et al. | |
| 2016/0203543 A1 | 7/2016 | Snow | |
| 2016/0223339 A1 | 8/2016 | Pellow et al. | |
| 2016/0247113 A1 | 8/2016 | Rademaker | |
| 2016/0253740 A1 | 9/2016 | Goulart | |
| 2016/0258762 A1 | 9/2016 | Taylor et al. | |
| 2016/0260158 A1 | 9/2016 | High et al. | |
| 2016/0299782 A1* | 10/2016 | Jones | G06Q 10/06316 |
| 2016/0314429 A1 | 10/2016 | Gillen et al. | |
| 2016/0321605 A1 | 11/2016 | Maifeld et al. | |
| 2016/0350837 A1 | 12/2016 | Williams et al. | |
| 2017/0024789 A1 | 1/2017 | Frehn et al. | |
| 2017/0069013 A1 | 3/2017 | Castillo | |
| 2017/0200108 A1 | 7/2017 | Au et al. | |
| 2017/0213186 A1 | 7/2017 | Grifoni | |
| 2017/0228701 A1 | 8/2017 | Wosk et al. | |
| 2017/0278047 A1 | 9/2017 | Welty et al. | |
| 2017/0285648 A1 | 10/2017 | Welty et al. | |
| 2017/0369245 A1 | 12/2017 | Suemitsu et al. | |
| 2018/0121992 A1 | 5/2018 | Agarwal et al. | |
| 2018/0137452 A1 | 5/2018 | Khartravath et al. | |
| 2018/0182054 A1* | 6/2018 | Yao | G06Q 30/0635 |
| 2018/0213811 A1* | 8/2018 | Kumar | G06Q 10/087 |
| 2018/0314991 A1* | 11/2018 | Grundberg | G06Q 30/0639 |
| 2018/0342031 A1 | 11/2018 | Tada et al. | |

FOREIGN PATENT DOCUMENTS

| | | |
|---|---|---|
| CN | 102137100 A | 7/2011 |
| CN | 102377629 A | 3/2012 |
| DE | 102012100354 | 7/2013 |
| WO | 2016119747 A1 | 8/2016 |
| WO | 2016119749 | 8/2016 |

OTHER PUBLICATIONS

G. Pedrielli, A. Vinsensius, E. P. Chew, L. H. Lee, A. Duri and Haobin Li, "Hybrid order picking strategies for fashion E-commerce warehouse systems," 2016 Winter Simulation Conference (WSC), Washington, DC, 2016, pp. 2250-2261, doi: 10.1109/WSC.2016.7822266. (Year: 2016).*

J. Shiau and H. Ma, "An order picking heuristic algorithm for economical packing," Proceedings of the 11th IEEE International Conference on Networking, Sensing and Control, Miami, FL, 2014, pp. 432-437, doi: 10.1109/ICNSC.2014.6819665. (Year: 2014).*

M. Bustillo, B. Menéndez, E. G. Pardo and A. Duarte, "An algorithm for batching, sequencing and picking operations in a warehouse," 2015 International Conference on Industrial Engineering and Systems Management (IESM), Seville, 2015, pp. 842-849, doi: 10.1109/IESM.2015.7380254. (Year: 2015).*

A. Ulbrich, S. Galka and W. A. Gunthner, "Secure Planning of Order Picking Systems with the Aid of Simulation," 2010 43rd Hawaii International Conference on System Sciences, Honolulu, HI, 2010, pp. 1-7, doi: 10.1109/HICSS.2010.326. (Year: 2010).*

Y. Wang, Z. Wang and S. Mi, "An order batching clustering algorithm of fixed maximum order number based on order picking system," 2017 4th International Conference on Industrial Economics System and Industrial Security Engineering (IEIS), Kyoto, 2017, pp. 1-6, doi: 10.1109/IEIS.2017.8078640. (Year: 2017).*

* cited by examiner

300

| New scenario | | | 302 | ✕ |
|---|---|---|---|---|
| Scenario name: | | | | |

304 {
- Zoning policy: Temperature band
- Base algorithm: Smart order batch    Batch size:
- Volumetric: Yes
- Routing policy: Sequencing
- Max due time: None ☑ Enable sub & nill pick

| Item name | Item substitute | Nill pick | Actions |
|---|---|---|---|
| Hersheys chocolate syrup | Hersheys strawberry syrup | ☐ | ✎ 🗑 |
| Nutella | | ☑ | ✎ 🗑 |
| Heinz mustard | | ☑ | ✎ 🗑 |
| Heinz tomato ketchup | | ☐ | ✎ 🗑 |

Cancel    [OK] ← 306

FIG. 3

Theoretical 15% reduction in picking time.
Results are based on predicted picking time.
These are averages across all of the loads run (2500 ambient across 5 stores).

SYSTEMS AND METHODS FOR FULFILMENT DESIGN AND OPTIMIZATION

CROSS-REFERENCE TO RELATED PATENT APPLICATIONS

This application claims priority to Indian Patent Application No. 201711016552, filed on May 11, 2017, the content of which is hereby incorporated by reference in its entirety.

BACKGROUND

Online demand arises from orders placed by users, while fulfillment is typically performed through one or more facilities. The orders are dispatched to destinations or are picked up from the one or more facilities. Picking involves retrieval of items from their storage locations (such as aisles in a facility) to satisfy orders.

BRIEF DESCRIPTION OF DRAWINGS

To assist those of skill in the art in making and using the system and associated methods described herein, reference is made to the accompanying figures. The accompanying figures, which are incorporated in and constitute a part of this specification, illustrate one or more embodiments of the present disclosure and, together with the description, help to explain the present disclosure. Illustrative embodiments are shown by way of example in the accompanying drawings and should not be considered as limiting. In the figures:

FIG. 3 illustrates a user interface in the form of a dashboard for creating a scenario, in accordance with an exemplary embodiment;

DETAILED DESCRIPTION

Figure 1:
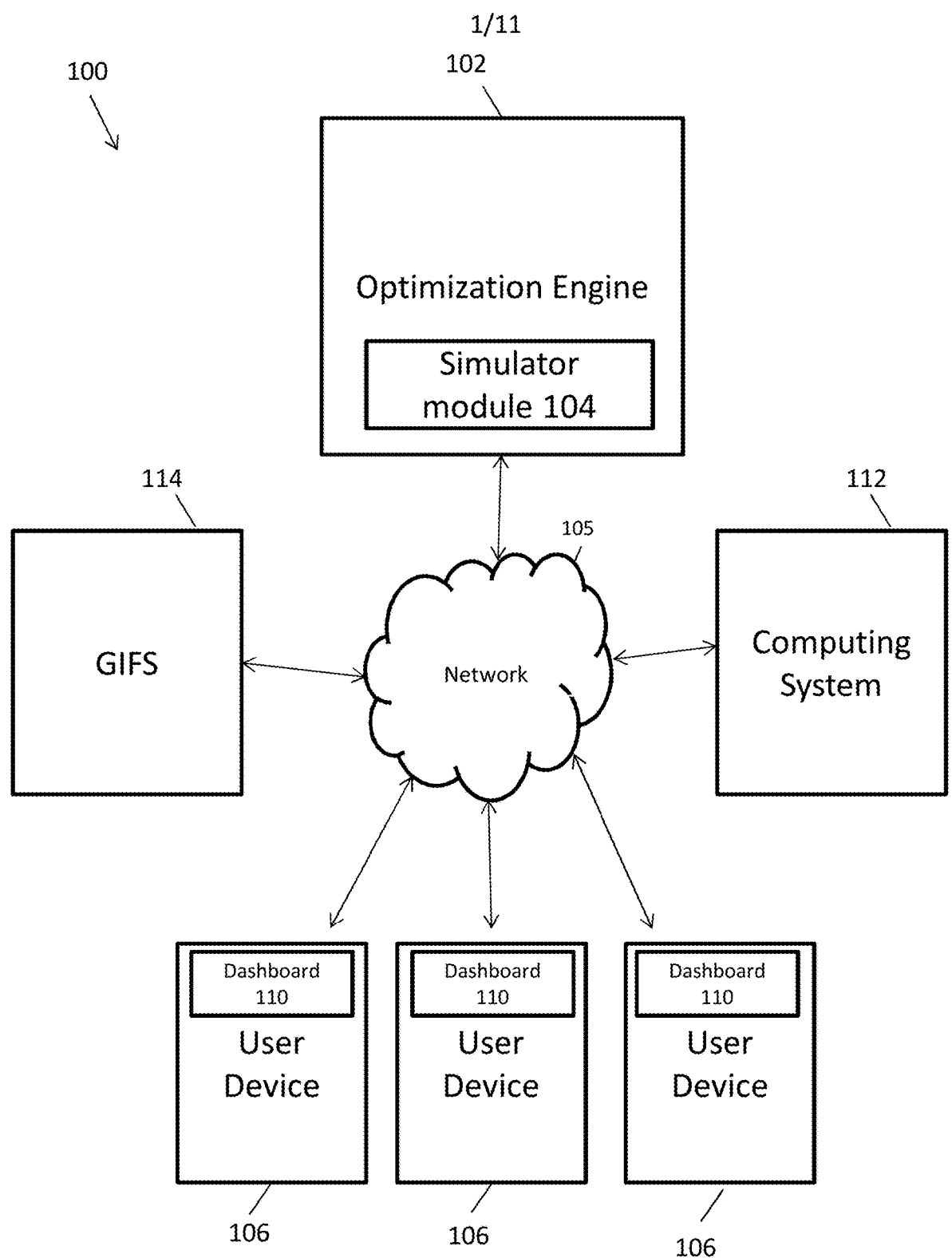
FIG. 1 illustrates an exemplary computer network for an optimization engine, in accordance with an exemplary embodiment.

Described in detail herein are methods and systems for order fulfillment optimization in a retail facility and reconfiguring a computing system to execute best policies. The system includes a dashboard display configured to receive costs and parameters as input, and display scenarios. The dashboard display includes one or more user interfaces as described herein. The system further includes a data storage device and an optimization engine communicatively coupled to the data storage device and the dashboard display. The optimization engine is configured to execute an simulator module that when executed receives, via the dashboard display, a plurality of costs. The costs may include one or more of a walking cost, a retrieval cost, a consolidation cost, and a consolidation space cost.

The optimization engine further receives, via the dashboard display, parameters for building at least two scenarios. The parameters may include a zoning policy, a routing policy, and/or a base algorithm policy. The optimization engine creates the at least two scenarios based on the parameters. The optimization engine receives, via the dashboard display, at least one identifier to associate with the at least two scenarios. The identifier may be, for example, a facility number or store number. The optimization engine executes scenario simulations for the at least one identifier based on the at least two scenarios and the plurality of costs. A scenario simulation simulates a process of picking items in orders based on the parameters and the costs at a location (e.g., facility, warehouse, store, etc.) associated with the identifier. The scenario simulation generates scenario information. The scenario information may include one or more of a pick rate, a distance per item, a total distance, a walk time, a retrieval time, a seek time, a consolidation time, a total time, items per tote, and total totes for the at least one facility.

The optimization engine selects a best scenario from the at least two scenarios based on the scenario information. In response to the selection of the best scenario, the optimization engine configures a computing system associated with the at least one identifier to execute a zoning policy, a routing policy, and a base algorithm policy associated with the best scenario. The computing system executes the zoning policy, the routing policy, and the base algorithm policy when generating a pick list to fulfill recently received orders or future orders.

Orders are received by a global integrated fulfillment system (GIF) prior to a start of a fulfillment process. The orders are then sent by the global integrated fulfillment system to a facility, such as a store or a warehouse, for fulfillment and slotted to be delivered from, for example, the warehouse to a delivery truck, another warehouse, or customers. Each order comprises a number of items that needed to be retrieved (also called being picked) to fulfill the order. A picker, such as an employee or an autonomous robot or drone, picks the items for the orders in accordance with a pick list generated for the picker. Several orders can be picked simultaneously and efficient routes can be devised to reduce travel times and improving pick rates.

Using the best scenario, the picker is guided in such a way that the picker automatically reaches a next pick-up point and long idle times are avoided. The picker is guided by a pick list of order lines, a quantity of items, and respective storage locations. The order lines are sorted into a sequence according to which order the picker is to collect the items. The configured computing system reduces travel time by creating pick lists that include one or more orders with maximum pick density, a sequence in which items of a given picking order are to be picked, and an identification of the corresponding (shortest) route for the picker which connects respective item locations and with the service stations. Overlapping items will significantly reduce search and retrieval time as well.

In some embodiments, the scenario simulations are performed using historical orders made during a specified time period. In additional embodiments, the scenario simulations are performed using recently received orders still to be fulfilled. In further embodiments, a global integrated fulfillment system provides the optimization engine with the historical orders and/or the orders requiring fulfillment. For example, the optimization engine interfaces with the global integrated fulfillment system.

In one embodiment, in which the scenario simulations are performed using orders still to be fulfilled, the global integrated fulfillment system releases orders at specified times and each order may include a date and/or a time when the orders are due (also referred to as a due time). The optimization engine may receive the orders from the global integrated fulfillment system and execute scenario simulations on the orders to compare different scenarios and choose a best scenario to fulfill the orders. In response to the selection of the best scenario, the optimization engine configures the computing system to execute a zoning policy, a routing policy, and a base algorithm policy associated with the best scenario. Alternatively, once configured, the computing system may receive current or future orders from the global integrated fulfillment system and generate a pick list to fulfill the orders.

The optimization engine further displays, via the dashboard display, scenarios and a comparison between the scenario information generated by the scenario simulations.

Order fulfillment may use policies, such as zoning policies, routing policies, and base algorithm policies, to attempt to minimize a total time of all trips required to pick items for orders. In particular, the base algorithm policies address batching, a problem of how to distribute orders among batches. Batching involves distributing orders across several batches and then sorting/routing pickers efficiently across locations to pick items for the orders. Since several orders are known before batching decisions are made, the orders may be grouped or batched based on commodity and according to when the orders are due (due time) such that items for the orders can be collected on one or more trips. Given a batch of orders, a trip may include, for example, a travel time a picker spends travelling from a service station to a first pick location, between the pick locations, and from a last pick location to the service station, a search time required for an identification of an item, and a retrieval time needed for moving items from a corresponding location onto a tote. Picking time is the time the picker takes to complete a trip on which items are collected. Batches are constrained by the capacity of the tote/trolley. Batching is impacted by a sequence in which locations of the items are visited by the pickers, the inter-item distances, and the distance to and from a service station.

The base algorithm policy includes Smart Order Batching, Split Batching, and Volumetrics Batching, as described below. The optimization engine uses the selected policy during the scenario simulation.

The Base Algorithm Policy: Smart Order Batching

Smart Order Batching resolves how orders due before a specified time and within a commodity are grouped into batches to be picked. For each batch, there is a sequence that a picker visits storage locations of the items (along with the route to and from the service stations) so that intra-item distances are minimized.

Smart Order Batching aims to minimize the total time required for the pick walk, while maximizing the total number of items picked. In order to facilitate this, engine 102 create N batches of P orders each (per commodity type) taking into consideration the due time of each order while batching them. P is a number of orders per batch as provided by GIF 108 and fixed per commodity. All items of an order must be part of a same batch. All items of P orders are picked in one trip.

The batching of the orders are optimized as follows. The engine 102 begins with one order as a single batch. For each additional order, the engine 102 uses proximity to determine whether it is favorable to pick the additional order separately or to add the additional order into an already existing batches with trolley/cart capacity. The output will be orders within a batch with maximum overlapping of items, thereby increasing a density of pick-up points until the capacity of the tote/trolley is exhausted. The engine 102 uses metaheuristic methods to batch orders or work on subset of orders and use greedy algorithm and/or other methods to optimize the objective function within orders. Orders may be further filtered by due time, load, and zone (commodity). Batching within a zone minimizes inter-item distance and maximizes pick density.

The total time required for the pick walk using Smart Order Batching is determined as follows. Forward walk (walking from a service station to a first location) and a last walk (walking from a last item to the service station) is non-significant and is 0. Inter-item walking is the most significant component of the walk. Seek time is constant for every first item but is 0 for overlapping items. Retrieval time is non-significant and is 0. Intra-item walking is calculated by subtracting sequence numbers. For example, items A and B are at 1 and 7, respectively, then the distance between them is 6. The assumption is that each subsequent sequence corresponds to 1 item. Accordingly, a total trip time for a batch of P orders is total inter-item walking time for the batch plus total seek time for the batch.

Smart Order Batching seeks to minimize inter-item distances and maximum pick density. For example, for batch 1, a picker or robot completes orders 1, 2, 3 with minimum inter-item distance and maximum pick density. A pick list 1 describes the sequence in which orders 1, 2, 3 are picked. For batch 2, the picker or robot complete orders 4, 5, 6 with minimum inter-item distance and maximum pick density. A pick list 2 describes a sequence in which orders 4, 5, 6 are picked. Orders with the same due time are serviced together to ensure picking is completed on time. This also provides highly dense picking zones.

The Base Algorithm Policy: Split Batching

In some circumstances, picking of partial orders may be preferable when one or more items of an order may be scattered across a warehouse and inter-item pick walks may be negatively impacted if a picker must walk across the warehouse to pick items. Other reasons for partial orders include the ability to batch overlapping orders that would not otherwise be batched.

Split Batching allows the splitting of orders, where items within an order may be collected on different trips. Portions of an order may be picked on different trips. Orders can be split and added to different existing batches, although this may increase the number of totes for the overall order. Split Batching assumes that batch size is less than or equal to tote/trolley capacity and that there is a variable number of orders per batch. Items of an order can be a part of different batches.

General merchandise and ambient (e.g., commodities) are the busiest and the biggest zones and requires splitting of orders within their aisles. For splitting orders, the engine 102 can dynamically create further subzones within these commodities to ensure that batches are formed within these sub-zones. In some embodiments, zones are created everyday based on order profiles. Orders may be further filtered by due time, zone, and commodity. Batching within a zone minimizes inter-item distance and maximizes pick density.

The total time required for the pick walk using Split Batching is determined as follows. Forward walk (walking to a service station to a first location) and a last walk (walking from a last item to the service station) is significant and is a constant. Inter-item walking is a significant component of the pick walk. Seek time is constant for every first item but is 0 for overlapping items. Retrieval time is non-significant and is 0. Intra-item walking is calculated by subtracting sequence numbers. For example, items A and B are at 1 and 7, respectively, then the distance between them is 6. The assumption is that each subsequent sequence corresponds to 1 item. Thus, total trip time for a batch of P orders is forward walk time plus inter-item walk time for the batch plus seek time for the batch plus last walk time.

The batching of the orders are optimized as follows. The engine 102 begin with one order as a single batch. For each additional order, the engine 102 uses proximity to determine whether it is favorable to pick the additional order separately or to add the additional order into an already existing batch that has trolley capacity. The output are batch orders with maximum overlapping of items, thereby increasing the density of pick-up points until the capacity of the tote/trolley is exhausted.

Split Batching minimizes total trip time by creating N batches of variable orders, each batch is based on a commodity type and a due time, where the total trip time is globally across all trips. Orders can be split across multiple batches. For example, batch 1 may include partial orders 1, 2 with minimum inter-item distance and minimum walking to and from the service station. Batch 2 may include a partial orders 1 and 2 with minimum inter-item distance and minimum walking to and from the service station.

Split Batching may also include highly overlapping large orders (spread across a large number of aisles) that are picked by two or more pickers in separate trips rather than having one picker take complete orders. For example, orders 1 and 2 may be spread out, creating sub-zones within the commodity and high density areas. Batch 1 may include partial batching of orders 1 and 2 in sub-zone 1. Batch 2 may include partial batching of orders 1 and 2 in sub-zone 2.

Taking more items in the trolley avoids more trips to pick those items. Any remaining totes of trolleys can bring back orders that may not have been overlapping and have been left behind and required a new trip. For example, at least some items of order 4 may have needed a new trip, in which case, batch 2 may, for example, include partial batching of orders 1, 2, and 4 in sub-zone 2.

The Base Algorithm Policy: Volumetric Batching

Volumetric Batching minimizes the total trip walk, as both inter-item walks and walking to and from the service station are significant. An approach of fixed P orders per batch may result in batches where a picker may have to walk multiple times to the service stations or may have empty totes at the end of the trip. Information on item volume and tote/trolley capacities enables the creation of batches with a variable number of orders per batch such that the total trip walk is minimized.

Volumetric Batching can be implemented in two ways, Split and No Split. In No Split, complete orders are moved into different pick walks to see what combinations minimize the pick walk. In Split version, full totes of orders are created and totes are moved around into different pick walks to see what combinations minimize pick walks (similar to Split Batching). This includes load capacity constraints to generate split orders or maximum split limits. Orders may be further filtered by due time, zone, and commodity. Batching within a zone minimizes inter-item distance and maximizes pick density.

Volumetric Batching requires that a batch size is less than or equal to tote/trolley capacity. There may be a variable number of orders per batch. All items of an order must be a part of the same batch and all items of P orders are picked in one trip. Forward walk (walking to a service station to a first location) and a last walk (walking from a last item to the service station) is significant and is a constant. Inter-item walk is a significant component of the walk. Seek time is constant for every first item but is 0 for overlapping items. Retrieval time is non-significant and is 0. Intra-item walking is calculated by subtracting sequence numbers. For example, items A and B are at 1 and 7, respectively, then the distance between them is 6. The assumption is that each subsequent sequence corresponds to 1 item. Thus, a total trip time for a batch of P orders is forward walk time plus inter-item walk time for the batch 1 plus seek time for the batch plus last walk time.

The batching of the orders using Volumetric Batching are optimized as follows. The engine 102 begins with one order as a single batch. For each additional order, the engine 102 uses proximity to determine whether it is favorable to pick the additional order separately or to add the additional order into an already existing batch with trolley capacity. The output is batch orders with maximum overlapping of items, thereby increasing the density of pick-up points until the capacity of the tote/trolley is exhausted.

Volumetric Batching minimizes total trip time by creating N batches of variable orders, where each batch is based on a commodity type and a due time, where the total trip time is globally across all trips. For example, batch 1 includes complete orders 1 and 2 with minimum inter-item distance and minimum walking to and from the service station. Adding order 3 would violate the capacity constraint and result in additional walking to and from the service station. Batch 2 includes complete orders 3, 4, 5, 6 with minimum inter-item distance and minimum walking to and from the service station as the picker fills 8 totes and require only one trip to the service station.

When there is No Split, overloaded and overlapping batches of orders may require multiple walks back and forth to the service stations to deposit and pick up totes due to capacity constraints, increasing the overall pick walk. For example, with batch 1, even though orders 1 and 2 overlap, a larger size of items of order 2 increases walking to and from the service stations. Instead, complete orders 1 and 3 are batched together. Batch 2 includes complete orders 2, 4, and 5. The picker fills the 8 totes and require only one trip to the service station.

When there is No Split, under-loaded and overlapping batches of orders may have items that do not requires all 8 totes. Accordingly, additional orders can be added to a trip that may not be overlapping but reduces the overall pick walk. For example, with batch 1, all orders may fit into 8 totes. Batch 1 may include orders 1, 2, 3, and 4 that have smaller item sizes, ensuring that any additional pick walks would increase the overall pick walk.

For Split volumetric, orders will be split into full totes across multiple pick lists to ensure minimum pick walk. This is similar to Split Batching with Volumetric constraints.

The engine 102 also uses a zoning policy during the simulation. The zoning policy includes temperature bands and XYZ co-ordinates, as described below.

Zoning Policy: Temperature Band

The engine 102 may redefines commodity based zoning based on temperature bands (ambient, chill and frozen), rather than the existing merchandise based zones. General merchandise and ambient are the busiest and the biggest zones and require splitting of orders within them.

For splitting orders, the engine 102 creates dynamic sub-zones within these temperature bands to ensure that batches are formed within these sub-zones. The sub-zones may be created daily. The sub-zones are based on aisle separations and inter aisle distances, rather than merchandise based zones. The sub-zones are picking based to ensure faster high density picking. Re-zoning of bigger commodities, such as ambient, enables for more picking friendly zones. Re-zoning makes inter-item walks as insignificant as possible without breaking an order into multiple portions.

Zoning Policy: XYZ Co-Ordinates

XYZ coordinates assist in determining accurate batching and optimum travel paths. Store mapping will consists of XY grid coordinates for locations and intersections. The Z coordinate corresponds to a height at locations and intersections. Locations are origins and destination of walks, such as rack, shelving, and block stacks, and pick-up and deposit stations or areas such as receiving and shipping or staging areas. Intersections are nodes on a travel network that define possible paths through the store, such as a wall or a dead end, ends of aisles, tunnels, entries, exits, corners, and other changes in direction. XYZ Co-ordinates offer precise distance and locations and provide better estimates of distances and pick walks.

The user selects a routing policy to find efficiencies in final routing of the pick walk. The user selects the routing policy as sequencing or XYZ Co-ordinates.

Routing Policies

Given a set of items to be collected and the respective locations where the items are stored, a route and a sequence is determined according to which of these locations should be visited such that the length of the corresponding picker trip is minimized. Optimal routes may be complicated and difficult to memorize, and pickers may prefer routes based on simple routing strategies. The application of routing strategies may be broken down into a s-shape heuristic approach, a return heuristic approach, a midpoint heuristic approach, and a largest gap strategy heuristic approach.

In the s-shape heuristic approach, the order picker traverses every picking aisle containing at least one item to be picked. In the return heuristic approach, the order picker enters and leaves every picking aisle to be visited from the front cross aisle. In the midpoint heuristic approach, the warehouse is divided equally into two areas, the front section and the rear section. All items located in the front section are accessed from the front cross aisle, while articles in the rear section are reached from the rear cross aisle. For the largest gap heuristic approach, in each aisle to be visited the two sections are determined by the largest distance between two adjacent requested items or between a requested items and the adjacent cross aisle.

FIG. 1 illustrates an exemplary network 100 for a fulfillment design and optimization system 100. The system 100 includes an optimization engine 102. The optimization engine 102 includes a simulator module 104 for creating and simulating scenarios. The optimization engine 102 communicates, via a communications network 105, with one or more user devices 106. The user device 106 executes a dashboard display 110 for entering costs and displaying scenarios. The dashboard display 110 may include webpages and/or an mobile and/or web application. The optimization engine 102 is connected, via the communications network 105, to a computing system 112 that executes parameters (e.g., the zoning policy, the routing policy, and the base algorithm policy) to assign picks and fulfill orders.

In some embodiments, the optimization engine 102 is connected, via the communications network 105, to a global integrated fulfillment system (GIF) 114 that provides the optimization engine 102 with orders. The GIF 114 releases orders at predefined times (for example, orders are aggregated until 4:00 am are released at 4:00 am and orders aggregated from 4:00 am to 10:00 am are released at 10:00 am). Order may have a due time and may be divided by commodity types. In some embodiments, the GIF 108 releases a fixed number of orders per batch.

The communications network 105 can be any network over which information can be transmitted between devices communicatively coupled to the network. For example, the communication network 105 can be the Internet, an Intranet, virtual private network (VPN), wide area network (WAN), local area network (LAN), and the like.

Figure 2A:
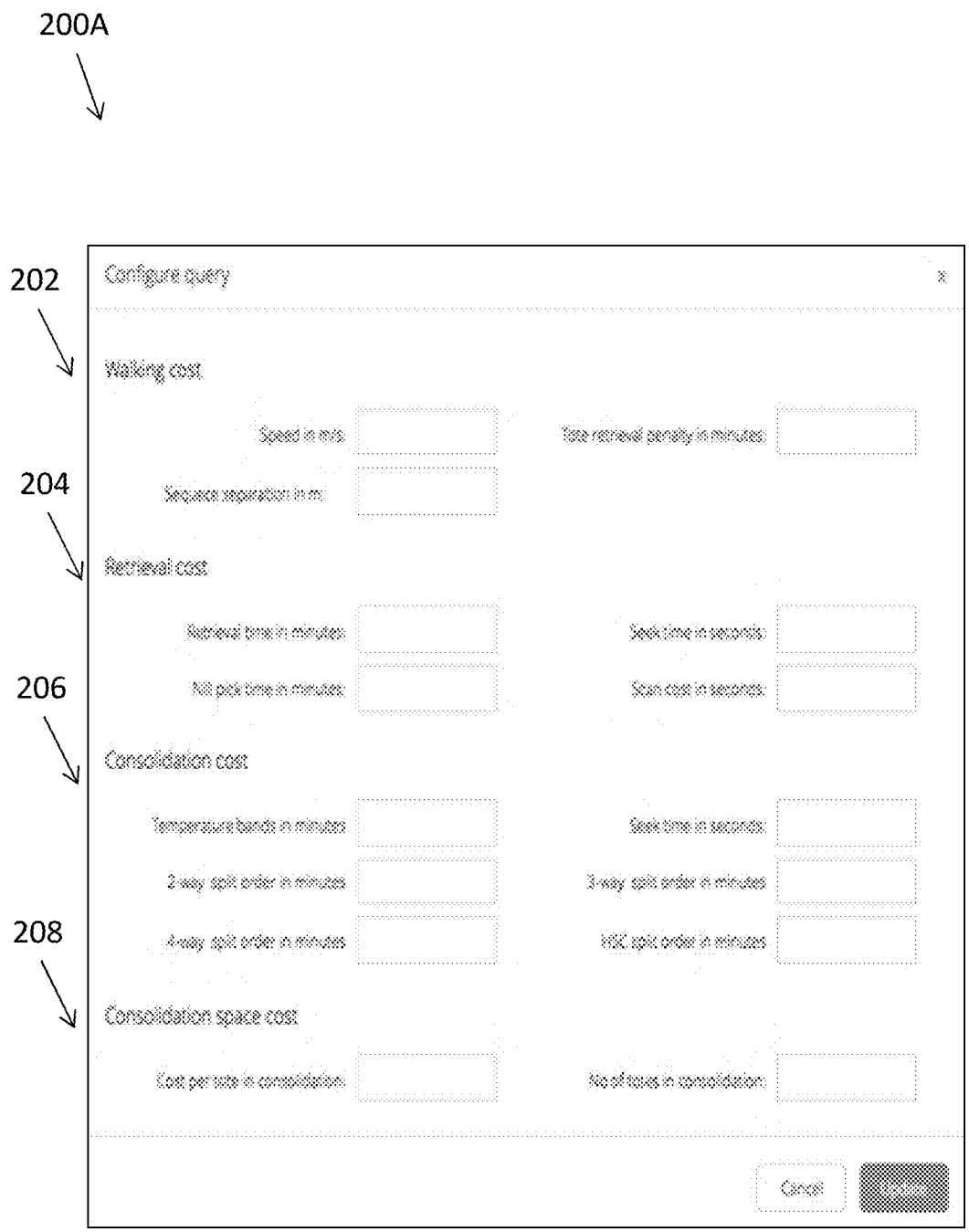
FIG. 2A-2B illustrates user interfaces in the form of dashboards for entering data into the optimization engine that can be used to simulate scenarios, in accordance with an exemplary embodiment.

FIG. 2A illustrates a user interface in the form of a dashboard 200A for entering costs into the optimization engine 102. The costs are used in the process of executing a scenario, according to an exemplary embodiment. The dashboard 200A is displayed on the user device 106 and is communicatively coupled to the optimization engine 102. The costs are associated with pick related costs that include, but are not limited to, walking costs 202, retrieval costs 204, consolidation costs 206, and consolidation space costs 208.

The walking costs 202 include one or more of a speed entered in meters per second, sequence separation entered in meters, and a total retrieval penalty entered in minutes. The retrieval costs 204 include one or more of a retrieval time in minutes, a nil pick time entered in minutes, a seek time entered in seconds, and a scan cost entered in seconds. The consolidation costs 206 include one or more of a temperature band entered in minutes, a 2-way split order entered in minutes, a 4-way split order entered in minutes, a seek time entered in seconds, a 3-way split order entered in minutes, and a HSC split order entered in minutes. The consolidation space cost 208 include one or more of a cost per tote in consolidation and a number of totes in consolidation.

Figure 2B:
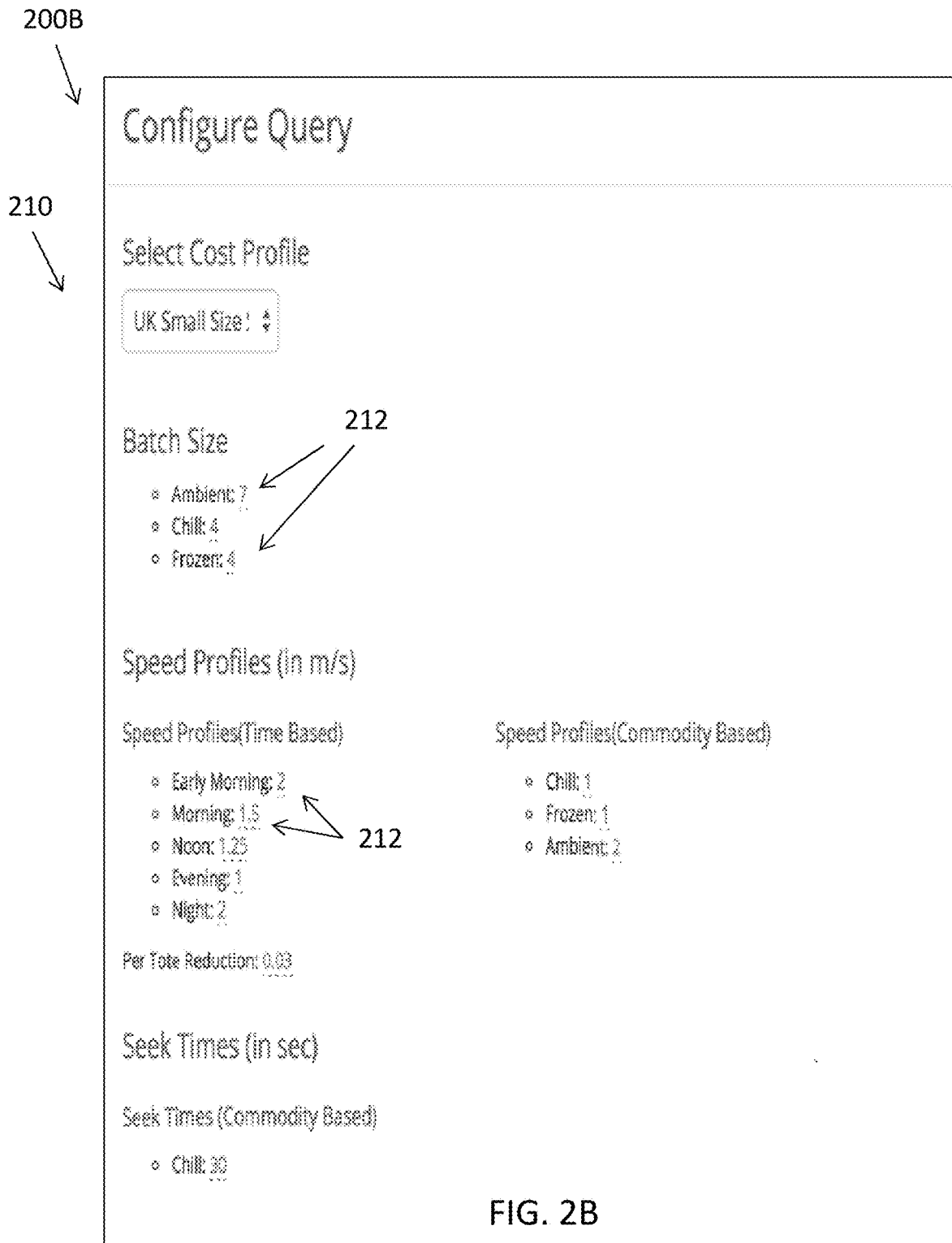

FIG. 2B illustrates another user interface in the form of a dashboard 200B for entering costs into the optimization engine 102 used in the process of executing a scenario, according to an exemplary embodiment. The dashboard 200B is displayed on the user device 106 and is communicatively coupled to the optimization engine 102. In dashboard 200B, the user selects a cost profile 210 from a menu. The user sets a cost value 212 for each parameter for the selected cost profile by entering a value. In one embodiment, each cost profile 210 includes default cost values.

FIG. 3 illustrates a user interface in the form of a dashboard 300 for creating a scenario, according to an exemplary embodiment. The dashboard 300 is displayed on the user device 106 and is communicatively coupled to the optimization engine 102 (hereafter, engine 102). A scenario is a combination of at least a zoning policy, a routing policy, and a base algorithm policy, as described below. In some embodiments, additional information such as a batch size and/or a due time are entered into the scenario.

To create a scenario, the user enters a descriptive scenario name 302 to associate with the created scenario. The user further enters parameters 304 regarding various aspects on which the user wants to run the scenario simulation. The parameters 304 include a zoning policy, a routing policy, and a base algorithm policy. In an exemplary embodiment, the user selects a zoning policy, a base algorithm policy, a routing policy, whether to use volumetrics, and a maximum due time. The user further enters a batch size based on a commodity for which the user wants to run the simulation. The user selects the routing policy as sequencing or XYZ. In some embodiments, the user selects a drop zone, such as a backroom or a service station, where the picker drops off the totes. In additional embodiments, the user may select bagging as true or false and/or enter a split size for split algorithms to split orders within commodities. To create the new scenario, the user selects a clickable button 306 to add the new scenario.

Figure 4A:
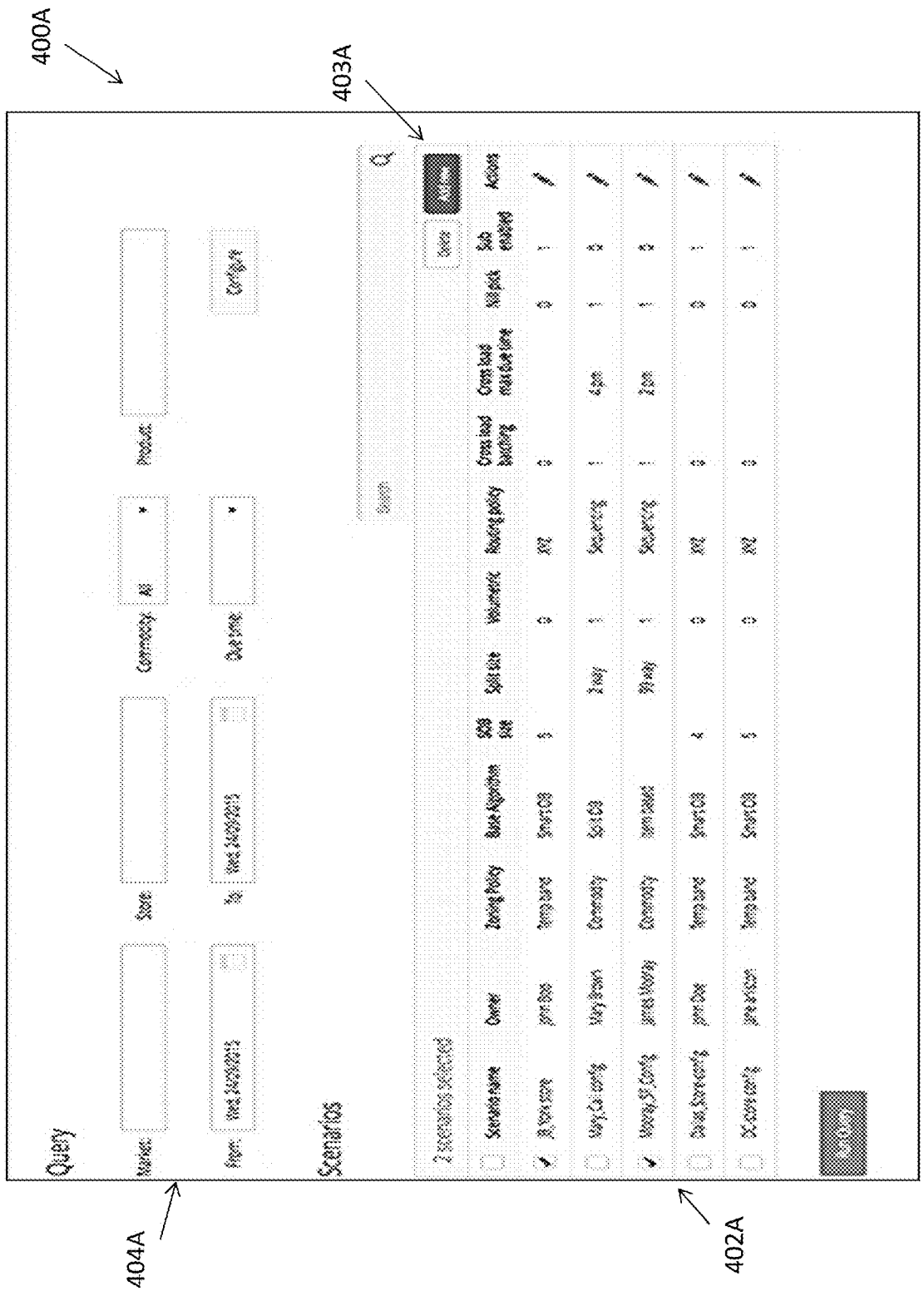
FIG. 4A-4C illustrates user interfaces in the form of dashboards for running scenario simulations, in accordance with an exemplary embodiment.

FIG. 4A illustrates a user interface in the form of a dashboard 400A for selecting and running scenarios, according to an exemplary embodiment. In the example embodiment, two scenarios are selected in table 402A listing a plurality of scenarios. One or more of the scenarios shown in table 402A are created using dashboard 300. A user can also choose to create a new scenario by selecting the clicking button 403A to go to dashboard 300. Each scenario shown in table 402A includes a descriptive scenario name, a zoning policy, a routing policy, a base algorithm policy, and other parameters selected in FIG. 3. The user is able to search, edit, delete, and add scenarios.

A user is able to build a query 404A for the selected scenarios. To build a query, a user enters at least one of a market (e.g., the United States market), a store (e.g., a store number), a commodity (e.g., ambient), a product or products, a beginning date and an end date, and a due time. The user selects one or more scenarios from the table 402A and simulates the selected scenarios. The engine 102 simulates the selected scenarios based on the information entered into the query 404A, parameters entered using dashboard 300 (and shown in table 402A), and costs entered using dashboard 200.

For example, a user enters into the query 404A a store number 1122 for the beginning date Jan. 1, 2010, and an end date of Jan. 1, 2011. Based on the input entered into the query 404A, the engine 102 obtains order information for Jan. 1, 2010 through Jan. 1, 2011 from the GIF 114 for the store number 1122 and simulates the selected scenarios for the store number 1122 based on the obtained order information.

Figure 4B:

FIG. 4B illustrates another user interface in the form of a dashboard 400B for selecting and running scenarios, according to an exemplary embodiment. on one or more stores based on the costs entered using dashboard 200 and the scenarios created using dashboard 300. In the example embodiment, scenarios are selectable in table 402B listing a plurality of scenarios. One or more of the scenarios shown in table 402B are created using dashboard 300. A user can also choose to create a new scenario by selecting the clicking button 403B to go to dashboard 300. Each scenario shown in table 402B includes a descriptive scenario name, a routing policy, a base algorithm policy, and other parameters selected in FIG. 3. The user is able to search, edit, delete, and add scenarios.

A user is able to build a query 404B for the scenarios selected from the table 402B. To build a query, a user enters at least one of a market, a store, a commodity, a product or products, a beginning date, a duration (number of days for which the simulator is to run starting with the from date, a load start, a load end, and a cost profile. The user selects one or more scenarios from the table 402B and simulates the selected scenarios. The engine 102 simulates the selected scenarios based on based on the information entered into the query 404B, parameters entered using dashboard 300 (and shown in table 402A), and costs entered using dashboard 200.

Figure 4C:

FIG. 4C illustrates a user interface in the form of a dashboard 400C for selecting and running scenarios for orders being received from GIF 114, according to an exemplary embodiment. In the example embodiment, two scenarios are selected in table 402C listing a plurality of scenarios. One or more of the scenarios shown in table 402C are created using dashboard 300. A user can also choose to create a new scenario by selecting the clicking button 403C to go to dashboard 300. Each scenario shown in table 402C may include a descriptive scenario name, a zoning policy, a routing policy, a base algorithm policy, and other parameters selected in FIG. 3. The user is able to search, edit, delete, and add scenarios.

A user is able to simulate the selected scenarios for orders received from the GIF 114. A user enters at least one of a market (e.g., the United States market), a store (e.g., a store number), a commodity (e.g., ambient), and a product or products. The user selects one or more scenarios from the table 402C and simulates the selected scenarios using orders released and received from the GIF 114. The engine 102 simulates the selected scenarios based on the information entered into the query 404C, parameters entered using dashboard 300 (and shown in table 402A), and costs entered using dashboard 200.

For example, a user enters into the query 404C store number 1122. The engine 102 obtains recently released orders from the GIF 114 for the store number 1122 and simulates the selected scenarios for the store number 1122. Store number 1122 may then use the best scenario to fulfill the recently released orders from the GIF 114.

The dashboards 400A and 400B are displayed on the user device 106 and are communicatively coupled to the optimization engine 102.

Figure 5:
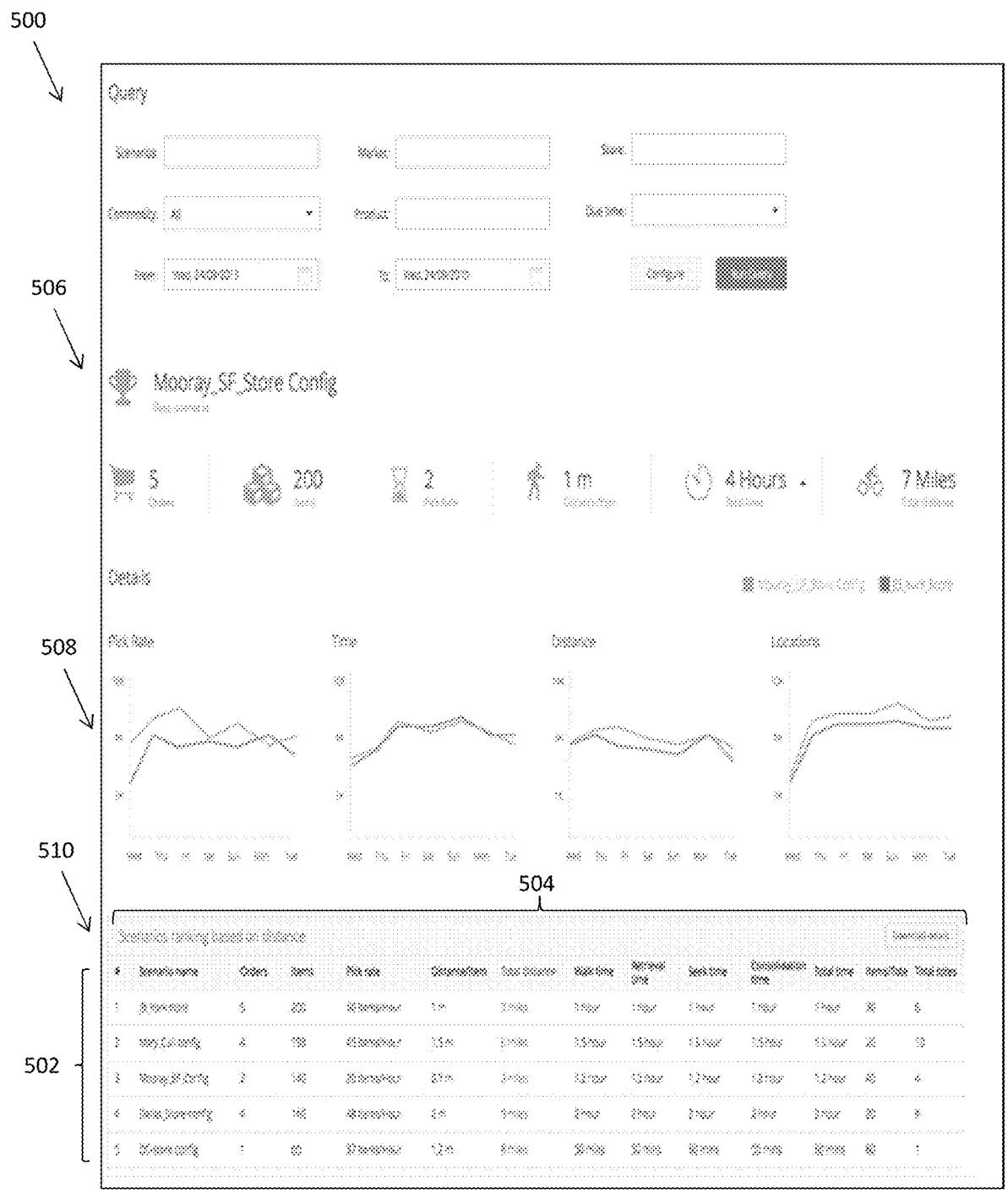
FIG. 5 illustrates a user interface in the form of a dashboard for comparing scenarios, in accordance with an exemplary embodiment.

FIG. 5 illustrates a user interface in the form of a dashboard 500 for comparing scenario simulations, according to an exemplary embodiment. The dashboard 500 is displayed on the user device 106 and is communicatively coupled to the optimization engine 102. The dashboard 500 displays several scenario simulations 502 for the same store or set of stores based on the costs and parameters entered in the dashboard display shown in FIGS. 2-4. Each scenario simulation provides results 504 of the simulation. The results 504 may include one or more of a pick rate, a distance per item, a total distance, a walk time, a retrieval time, a seek time, a consolidation time, a total time, total totes for the selected store or set of selected stores, a rank of an scenario, a name of the scenario, a number of orders processed, a number of items, a total pick time, a number of items per tote, and/or a total totes produced.

Based on the scenario simulations, a best scenario 506 is determined. In an exemplary embodiment, the best scenario is determined based on the simulations that provides that best pick rates. However, in alternative embodiment, the best scenario may be based on a different result or results.

In addition, graphs 508 visually compare the selected scenarios, for example, a comparison of the pick rate, total time, total distance and number of picks lists of the selected scenarios. A table 5010 lists the scenarios and for each scenario provides details of the simulation results 504. The table 506 enables a comparison of the different results for each scenario simulation. In some embodiments, a pick list button is included enabling the user to download the pick list for each scenario selected.

Figure 6:
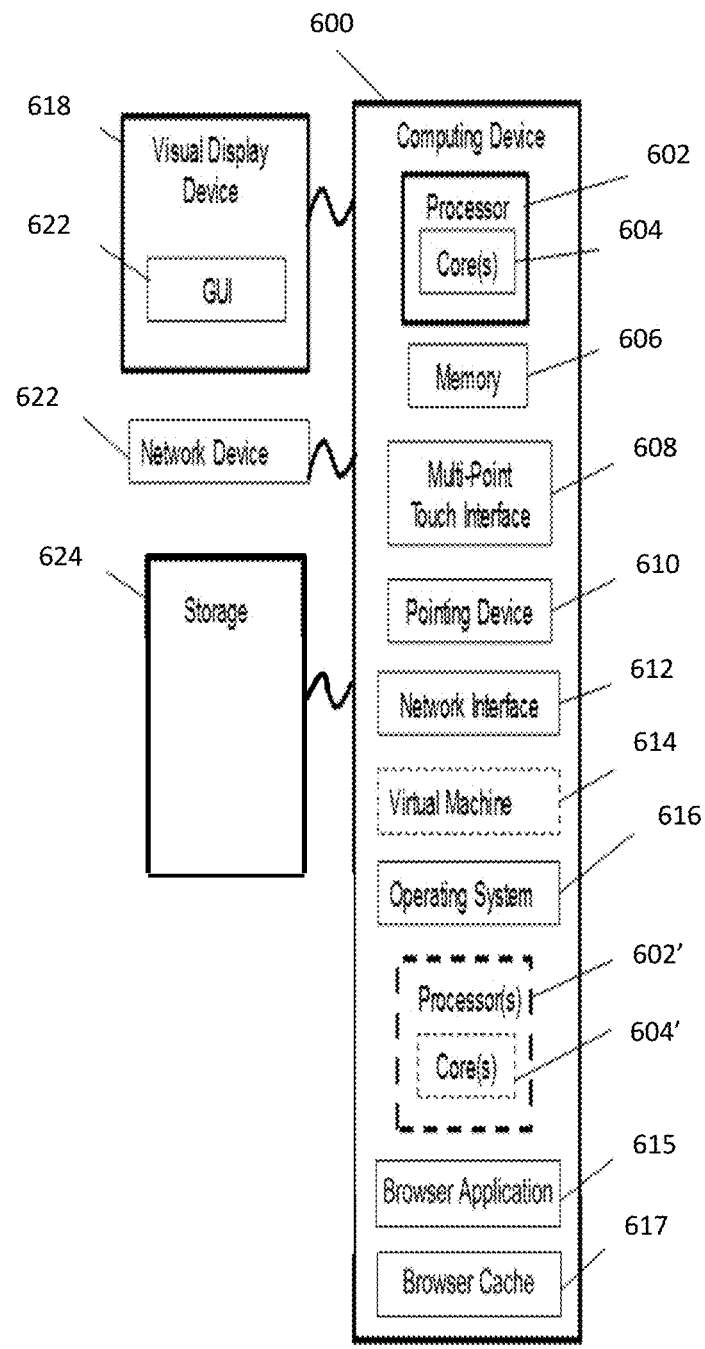
FIG. 6 is a is a block diagram of an exemplary computing device suitable for use in an exemplary embodiment.

FIG. 6 is a block diagram of an example computing device 600 that can be used to perform one or more steps provided by exemplary embodiments. In an exemplary embodiment, computing device 600 is an optimization engine (e.g. optimization engine 102 as shown in FIG. 1) and/or a user device (e.g. user device 106 shown in FIG. 1). Computing device 600 includes one or more non-transitory computer-readable media for storing one or more computer-executable instructions or software for implementing exemplary embodiments such as the prioritization module described herein. The non-transitory computer-readable media can include, but are not limited to, one or more types of hardware memory, non-transitory tangible media (for example, one or more magnetic storage disks, one or more optical disks, one or more USB flash drives), and the like. For example, a memory 606 included in computing device 600 can store computer-readable and computer-executable instructions or software for implementing exemplary embodiments such as the prioritization module described herein. Computing device 600 also includes a processor 602 and an associated core 604, and optionally, one or more additional processor(s) 602' and associated core(s) 604' (for example, in the case of computer systems having multiple processors/cores), for executing computer-readable and computer-executable instructions or software stored in memory 606 and other programs for controlling system hardware. Processor 602 and processor(s) 602' can each be a single core processor or multiple core (604 and 604') processor.

Computing device 600 may include a browser application 615 and a browser cache 617. As described above, browser application 615 can enable a customer to view the dashboard display, including the user interfaces shown in FIGS. 2-5.

Virtualization can be employed in computing device 600 so that infrastructure and resources in the computing device can be shared dynamically. A virtual machine 614 can be provided to handle a process running on multiple processors so that the process appears to be using only one computing resource rather than multiple computing resources. Multiple virtual machines can also be used with one processor.

Memory 606 can include a computer system memory or random access memory, such as DRAM, SRAM, EDO RAM, and the like. Memory 606 can include other types of memory as well, or combinations thereof. In some embodiments, a customer can interact with computing device 600 through a visual display device 618, such as a touch screen display or computer monitor, which can display one or more customer interfaces 622 that can be provided in accordance with exemplary embodiments. Visual display device 618 may also display other aspects, elements and/or information or data associated with exemplary embodiments. Computing device 600 may include other I/O devices for receiving input from a customer, for example, a keyboard or any suitable multi-point touch interface 608, a pointing device 610 (e.g., a pen, stylus, mouse, or trackpad). The keyboard 608 and pointing device 610 may be coupled to visual display device 618. Computing device 600 may include other suitable conventional I/O peripherals.

Computing device 600 can also include one or more storage devices 624, such as a hard-drive, CD-ROM, or other computer readable media, for storing data and computer-readable instructions and/or software. Exemplary storage device 624 can also store one or more storage devices for storing any suitable information required to implement exemplary embodiments.

Computing device 600 can include a network interface 612 configured to interface via one or more network devices 622 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 612 can include a built-in network adapter, network interface card, PCMCIA network card, card bus network adapter, wireless network adapter, USB network adapter, modem or any other device suitable for interfacing computing device 600 to any type of network capable of communication and performing the operations described herein. Moreover, computing device 600 can be any computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

Computing device 600 can run any operating system 616, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 616 can be run in native mode or emulated mode. In an exemplary embodiment, the operating system 616 can be run on one or more cloud machine instances.

In a non-limiting exemplary operation of an embodiment of the system, costs are received by an embodiment of the optimization engine executing on a computing device via one or more user interfaces, and parameters for building a scenario are received by the optimization engine via the one or more user interfaces. A global integrated fulfillment system configured to provide the optimization engine with orders. The parameters can include at least a zoning policy, a routing policy, and a base algorithm policy. The scenario can be created by the optimization engine based on the received parameters. An identifier of at least one facility can be received by the optimization engine to associate the at least one facility with the scenario. A scenario simulation on the at least one facility is executed by the optimization engine based on the scenario and the costs, wherein the scenario simulation generates a best scenario. The best scenario is used by a computing system to generate picks for the at least one facility.

In a non-limiting exemplary operation of an embodiment of the system, one or more additional scenarios can be created by the optimization engine based on additional parameters entered by the user, and additional scenario simulations on the at least one facility can be executed by the optimization engine based on the one or more additional scenarios. A best scenario can be identified by the optimization engine based on the pick information. A comparison between the pick information generated by the scenario simulations can be displayed on a display via the one or more user interfaces.

Figure 7:
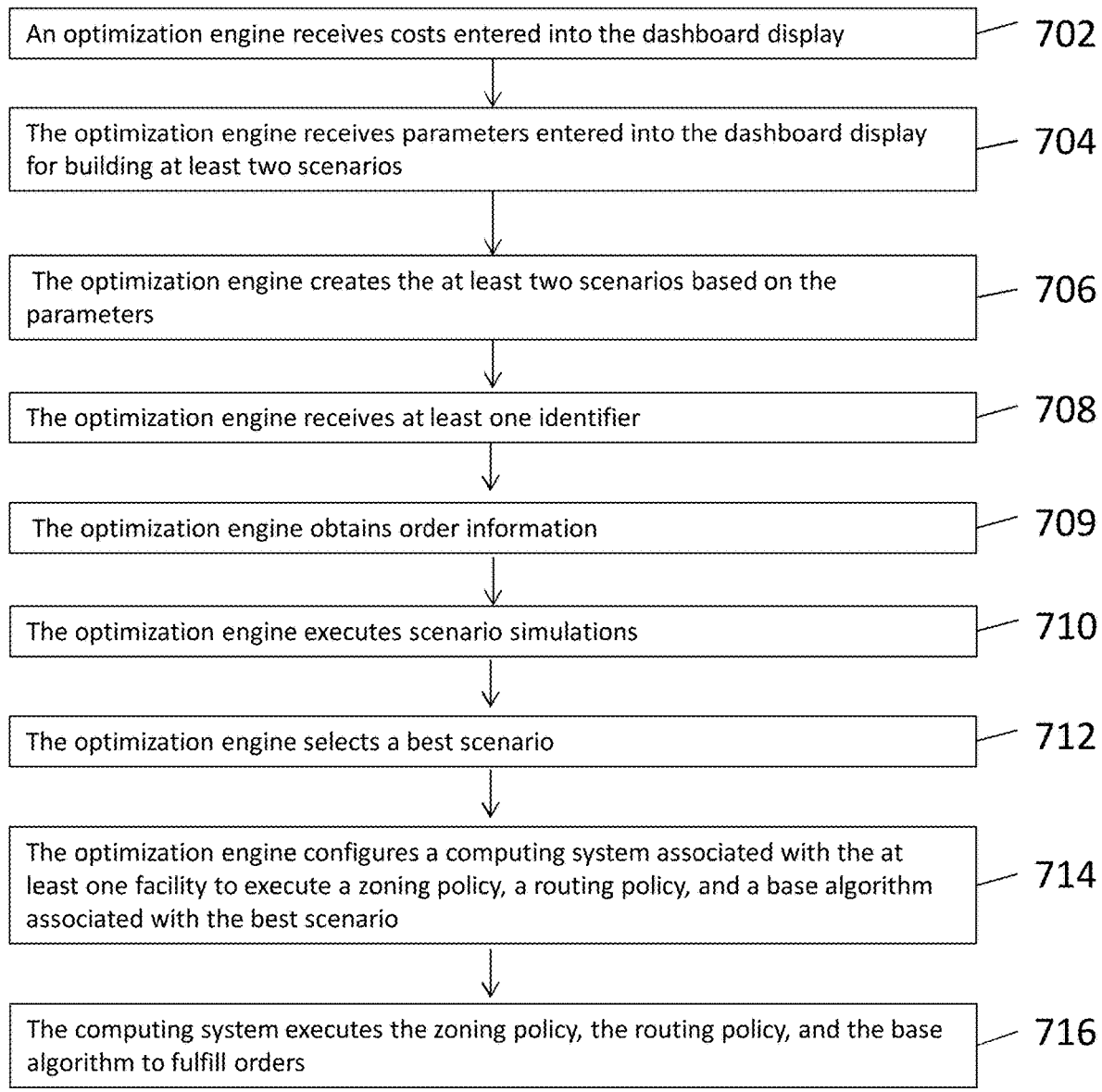
FIG. 7 illustrates a method for reconfiguring a computing system to execute best policies, in accordance with an exemplary embodiment.

FIG. 7 illustrates a method for reconfiguring a computing system to executing determined policies, according to an exemplary embodiment. At step 702, an optimization engine, communicatively coupled to a dashboard display configured to receive costs and parameters as input, receives costs entered into the dashboard display. At step 704, the optimization engine receives parameters entered into the dashboard display for building at least two scenarios. The parameters include at least a zoning policy, a routing policy, and a base algorithm policy. At step 706, the optimization engine creates the at least two scenarios based on the parameters. At step 708, the optimization engine receives at least one identifier entered into the dashboard display to associate with the at least two scenarios. At step 709, the optimization engine obtains order information, for example, from the global integrated fulfillment system configured to provide the optimization engine with orders. At step 710, the optimization engine executes scenario simulations for the at least one identifier and the order information based on the at least two scenarios and the plurality of costs, wherein the scenario simulations generates scenario information associated the at least one facility. At step 712, the optimization engine selects a best scenario from the at least two scenarios based on the scenario information. At step 714, in response to selection of the best scenario, the optimization engine configures a computing system associated with the at least one facility to execute a zoning policy, a routing policy, and a base algorithm policy associated with the best scenario. At step 716, the computing system executes the zoning policy, the routing policy, and the base algorithm policy to fulfill orders.

Figure 8:
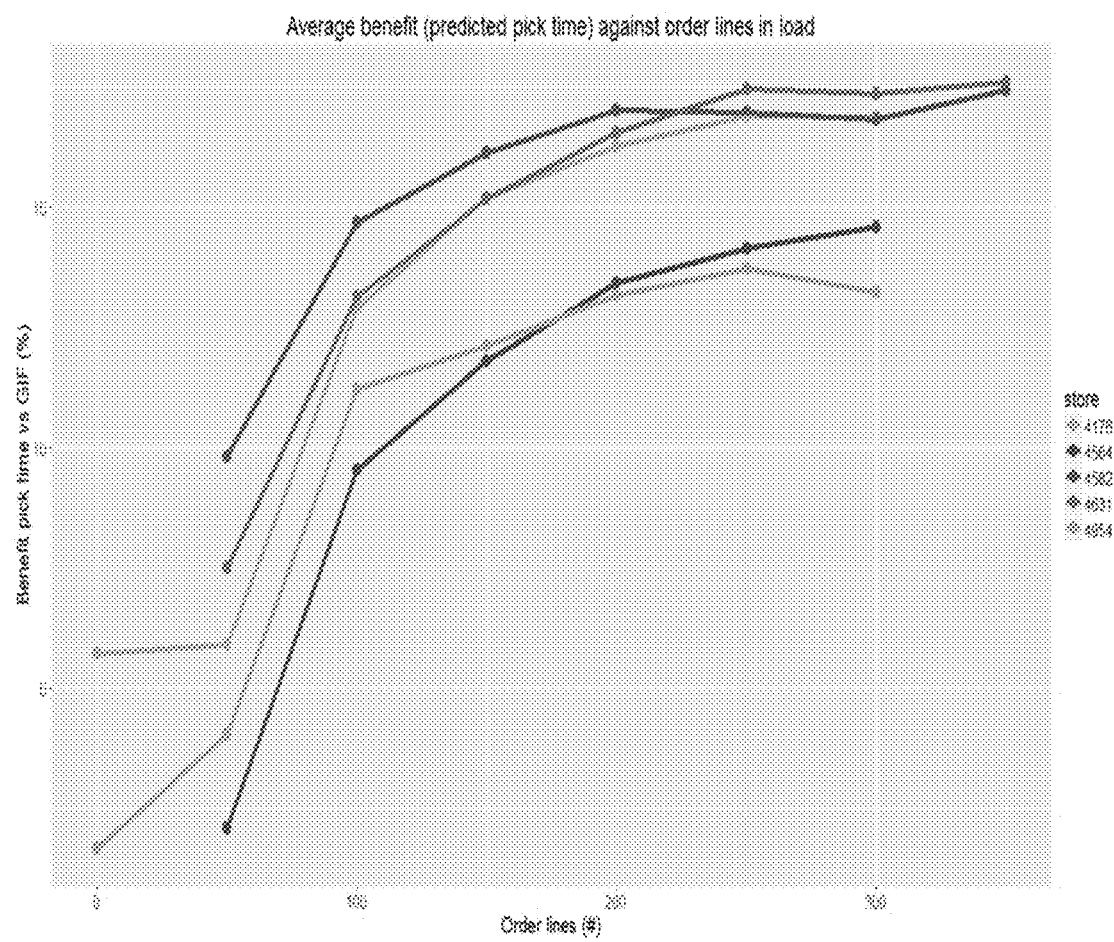
FIG. 8 is a graph illustrating improvements using the methods and systems described herein.

FIG. 8 illustrates a graph showing results of improvements made by the optimization engine. The results show a benefit percentage of the optimization engine selecting a best scenario and a computing system using the best scenario to produce a pick list versus a pick list produced by the GIF. Using the systems and methods described herein may lead to a greater than 15% reduction in picking time.

The description herein is presented to enable any person skilled in the art to create and use a computer system configuration and related method and systems for executing scenario simulations and reconfiguring a computing system to executing determined policies. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps can be replaced with a single element, component or step. Likewise, a single element, component or step can be replaced with a plurality of elements, components or steps that serve the same purpose. Moreover, while exemplary embodiments have been shown and described with references to particular embodiments thereof, those of ordinary skill in the art will understand that various substitutions and alterations in form and detail can be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

We claim:

1. A system for reconfiguring a computing system to execute best policies, the system comprising:
a dashboard display configured to receive costs and parameters as input, and display scenarios;
a data storage device; and
an optimization engine communicatively coupled to the data storage device and the dashboard display, the optimization engine configured to execute an simulator module that when executed:
receives, via the dashboard display, a plurality of costs;
receives, via the dashboard display, parameters for building at least two scenarios, the parameters including at least a zoning policy, a routing policy, and a base algorithm;
creates the at least two scenarios based on the parameters;
receives, via the dashboard display, at least one identifier to associate with the at least two scenarios;
executes scenario simulations for the at least one identifier based on the at least two scenarios and the plurality of costs, wherein the scenario simulations generates scenario information associated with the at least one identifier;
selects a best scenario from the at least two scenarios based on the scenario information; and
in response to selection of the best scenario, configures a computing system associated with the at least one identifier to execute a zoning policy, a routing policy, and a base algorithm policy associated with the best scenario,
wherein the computing system executes the zoning policy, the routing policy, and the base algorithm policy to generate a pick list to fulfill orders.

2. The system of claim 1, wherein the scenario information includes one or more of a pick rate, a distance per item, a total distance, a walk time, a retrieval time, a seek time, a consolidation time, a total time, items per tote, and total totes for the at least one identifier.

3. The system of claim 1, the simulator module, when executed, further configured to:
create one or more additional scenarios based on additional parameters entered by the user; and
execute additional scenario simulations on the at least one identifier based on the one or more additional scenarios.

4. The system of claim 1, the simulator module, when executed, further configured to display scenarios and a comparison between the scenario information generated by the scenario simulations.

5. The system of claim 1, wherein the costs includes one or more of a walking cost, a retrieval cost, a consolidation cost, and a consolidation space cost.

6. The system of claim 1, further comprising a global integrated fulfillment system configured to provide the optimization engine with orders.

7. The system of claim 1, wherein the scenario simulations are performed using historical orders made during a specified time period.

8. The system of claim 1, wherein the scenario simulations are performed using recently received orders to be fulfilled.

9. A method comprising:
receiving, via an optimization engine communicatively coupled to a dashboard display configured to receive costs and parameters as input, a plurality of costs entered into the dashboard display;
receiving, via the optimization engine, parameters entered into the dashboard display for building at least two scenarios, the parameters including at least a zoning policy, a routing policy, and a base algorithm policy;
creating, via the optimization engine, the at least two scenarios based on the parameters;
receiving, via the optimization engine, at least one identifier entered into the dashboard display to associate with the at least two scenarios;
executing, via the optimization engine, scenario simulations for the at least one identifier based on the at least two scenarios and the plurality of costs, wherein the scenario simulations generate scenario information associated with the at least one identifier;
selecting, via the optimization engine, a best scenario from the at least two scenarios based on the scenario information; and
in response to selection of the best scenario, configuring, via the optimization engine, a computing system associated with the at least one identifier to execute a zoning policy, a routing policy, and a base algorithm policy associated with the best scenario,
wherein the computing system executes the zoning policy, the routing policy, and the base algorithm policy to generate a pick list to fulfill orders.

10. The method of claim 9, wherein the pick information includes one or more of a pick rate, a distance per item, a total distance, a walk time, a retrieval time, a seek time, a consolidation time, a total time, items per tote, and total totes for the at least one store.

11. The method of claim 9, further comprising:
creating, by the optimization engine, one or more additional scenarios based on additional parameters entered by the user; and
executing, by the optimization engine, additional scenario simulations on the at least one identifier based on the one or more additional scenarios.

12. The method of claim 9, further comprising displaying a comparison between the pick information generated by the scenario simulations.

13. The method of claim 9, wherein the costs includes one or more of a walking cost, a retrieval cost, a consolidation cost, and a consolidation space cost.

14. The method of claim 9, further comprising a global integrated fulfillment system configured to provide the optimization engine with orders.

15. The method of claim 9, further comprising executing, via the optimization engine, the scenario simulations using historical orders made during a specified time period.

16. The method of claim 9, further comprising executing, via the optimization engine, the scenario simulations using recently received orders to be fulfilled.

* * * * *